April 22, 1969   H. J. SHOCKEY   3,440,315
METHOD OF BEDDING PANELS INTO FRAMES
Filed March 29, 1966

INVENTOR.
HOWARD J. SHOCKEY
BY
WILSON, SETTLE, BATCHELDER
ATT'YS.   & CRAIG

United States Patent Office 3,440,315
Patented Apr. 22, 1969

3,440,315
METHOD OF BEDDING PANELS INTO FRAMES
Howard J. Shockey, Elkhart, Ind., assignor to Excel Corporation, Elkhart, Ind., a corporation of Indiana
Filed Mar. 29, 1966, Ser. No. 538,301
Int. Cl. B32b 31/06
U.S. Cl. 264—261                                8 Claims

ABSTRACT OF THE DISCLOSURE

The method relates to the bedding of a panel into a frame which has interior surfaces defining a recess for receiving a marginal edge of the panel. In the method, the recess is dammed at two places spaced from each other along the length of the frame. The recess is filled with liquid bedding material between the dams, and a marginal edge of the panel is immersed thereinto. The damming bodies are then heated to cure liquid bedding material immediately adjacent thereto. The liquid bedding material cures to a solid form and thus serves as additional dams. The original damming bodies are then removed and the remaining bedding material is cured to a solid form by heating.

CROSS-REFERENCE TO RELATED APPLICATION

This application is related to a co-pending application of Robert J. Deisenroth, Ser. No. 222,590, filed Sept. 10, 1962, now Patent No. 3,263,014, issued July 26 1966, and assigned to the present assignee.

BACKGROUND OF THE INVENTION

One application for the method of the invention is in the framing of glass panels for automobile windows. It is well known that the glass of automobile windows frequently has a metal frame extending along at least one side of the glass. In some cases a frame is provided on an upper and/or side edge of the glass, but even in cases where these edges are not framed it may still be desirable to provid a frame on the lower edge of the glass which is located inside the door of the automobile. In the past, window panels have been bedded into metal frames by the use of rubber strips. A worker folds a rubber strip about an edge of the glass panel and the rubber covered edge is then inserted into a channel shaped recess of a metal frame. This method of bedding has several disadvantages. Excess rubber has to be trimmed off manually with a knife. Rubber strips of different thicknesses must be used for the different glass thicknesses. The method is relatively messy, and it has been necessary to clean the window after the processing. The method is carried out manually and labor costs are relatively high.

In order to overcome these disadvantages, it has been proposed to bed glass panels into metal frames by injecting heat curable liquid bedding material between the panel and the frame and curing the liquid bedding material to a solid form in which it is adherent both to the panel and to the frame. This method provides a solid but resilient bed for the panel in the frame. Among the advantages of this method are that it automatically compensates for different thicknesses of glass, it is a clean procedure and no cleanup step is required, no trimming of excess material is required, and a water-tight seal is provided without the use of separate sealers. A method of this type has been described in a co-pending application of Robert J. Deisenroth, Ser. No. 222,590, filed Sept. 10, 1962, and assigned to the assignee of this application. In the method of that application, a sealed cavity was formed in the frame, and liquid bedding material was injected under pressure into the sealed cavity. It would be desirable to have a method which does not require sealing of a cavity since the seal is rather critical.

It has recently been proposed to dam the recess of a frame member so that it will hold a liquid, partially fill the recess with liquid bedding material, insert a panel edge in the liquid and cure the liquid bedding material to its solid form. This method retains the advantages of the injection method of the co-pending application, but does not require a seal. The liquid bedding material is cured to its solid form by heat, and it is preferable to place the assembled frame and panel with liquid bedding material in the frame into an oven in order to accomplish the curing step. As a result of the curing, the damming bodies may be bonded to the bedding material and they may deteriorate from the heat of curing. This is not critical in all applications, but in some cases it is desirable to remove the damming bodies from the assembly.

The present invention now proposes to dam the frame's recess initially with temporary damming bodies which can be removed at a later stage of the processing. The recess is partially filled with heat curable liquid bedding material while the temporary damming bodies are in place, and the edge of a panel is placed in the liquid bedding material in the recess. The damming bodies are heated to a curing temperature for the liquid bedding material and this heat solidifies the liquid bedding material contacting and immediately adjoining the damming bodies. The solidified material forms additional dams which hold the remaining liquid bedding material in the recess, so the temporary damming bodies may be removed from the assembly. The remaining liquid bedding material is then heated at a curing temperature to cure it to its solid form, and this curing step may be carried out by placing the frame and panel assembly in an oven maintained at the curing temperture for a predetermined time. The method thus provides a solid bed of cured bedding material for the panel in the frame.

It is an object of the present invention to provide a method of bedding a panel into a frame by the use of heat curable liquid bedding material and temporary damming bodies.

Another object of the invention is to provide a method of bedding a panel into a frame wherein portions of the liquid bedding material in a recess of a frame are solidified to form dams for retaining the liquid in the frame.

Another object of the invention is to dam a channel containing heat curable liquid bedding material, such that the dams will retain the liquid in the channel, by heating the body of liquid at its ends to solidify end portions of the liquid body which then act as dams for the remaining liquid.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
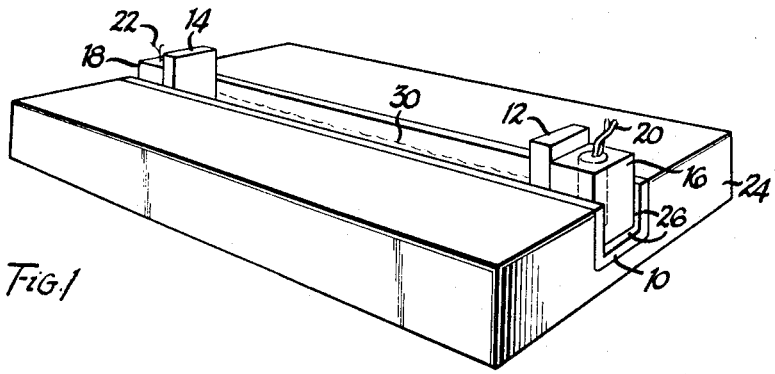
FIGURE 1 is a perspective view showing a channel shaped frame which has been dammed with damming bodies and which contain liquid bedding material between the damming bodies.

As shown on the drawings:

The first step of the method of the invention is to dam a recess of a frame member so that it will hold liquid bedding material. The results of this step are shown in FIGURE 1 wherein the channel-shaped frame 10 is dammed by two damming bodies 12 and 14 extending transversely of the frame member and fitting within the recess of the frame. Since the damming bodies are to be heated later on in the process, two cartridge heating blocks 16 and 18 have also been placed in the channel and in contact with the damming bodies 12 and 14 respectively. Each of these blocks 16 and 18 contains a cartridge heater with leads 20 and 22 to be energized for heating up the blocks 16 and 18 in a later step of the method. The frame member 10 is supported in a fixture block 24 which has a recess therein conforming to the configuration of the channel-shaped frame 10. The frame 10 has interior surfaces 26 which define the recess of the frame member.

After the frame has been dammed, the recess of the frame between the damming bodies 12 and 14 is partially filled with liquid bedding material 30. In filling the recess, allowance must be made for displacement of liquid bedding material when the panel is later inserted into the recess of the frame 10. Enough bedding material is initially supplied to the recess so that after the panel has been inserted the recess will be very nearly full of liquid bedding material.

The liquid bedding material is a resinous material which should have the following properties:

(1) Resiliency to provide a suitable bedding for the glass.

(2) Adherence to provide a bond between the glass and metal frame.

(3) Curability to a solid state in a relatively short time by the application of heat, for example, within about 45 seconds at about 250° F.

(4) Resistance to weathering (sunlight, temperature changes and moisture absorption).

(5) Mechanical properties such as tensile strength, compressive strength, impact resistance and toughness sufficient to withstand the stress normally encountered in use of the final assembly.

The bedding material may be either a thermoplastic or a thermosetting plastic material. One class of resins suitable as bedding materials are the polyurethane resins. Polyurethane resins are obtained by the reaction of polyisocyanates with organic compounds containing two or more active hydrogens to form polymers having free isocyanate groups. Under the influence of heat, the free isocyanate groups react to form a thermosetting material. A suitable thermosetting form may be prepared from castor oil and a triisocyanate. A suitable thermoplastic material is polyvinyl resin.

Figure 2:
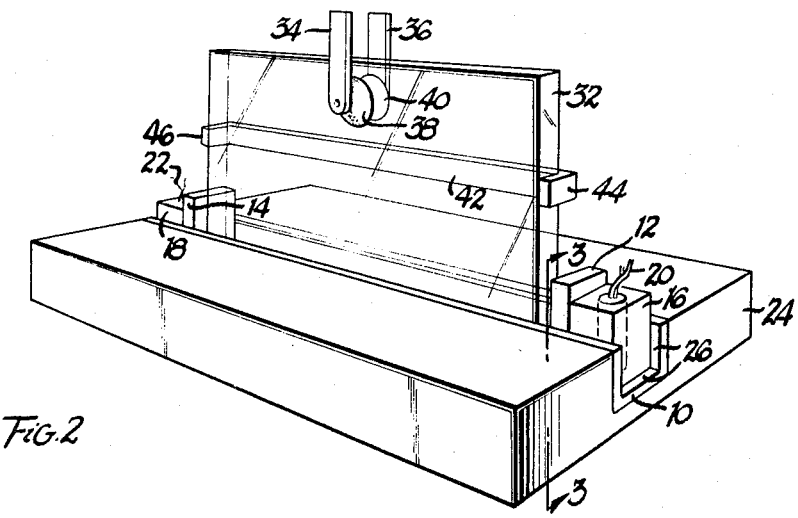
FIGURE 2 is a perspective view showing the assembly of FIGURE 1 after a glass panel has been inserted at one edge into the liquid bedding material.

After the frame member 10 has been partially filled with liquid bedding material, a marginal edge of a panel 32 is inserted into the liquid bedding material and the resulting assembly of panel and frame together with fixturing apparatus is shown in FIGURE 2. The panel 32 is held in the upright position shown in FIGURE 2 by arms 34 and 36 which have suction cups 38 and 40 contacting opposite sides of the panel 32. The panel is further braced by an arm 42 which has inwardly bent end portions 44 and 46 embracing the side edges of the glass and serving to center the glass within the frame 10. The edge of panel 32 which has been inserted into the liquid bedding material extends down into the recess of the frame 10, but does not touch either the bottom nor the sides of the interior surfaces 26. The panel 32 is thus closely spaced from the interior surfaces of the frame 10. When the panel is inserted in the liquid bedding material, it displaces some of the liquid bedding material up between the sides of the panel and the side portions of the interior surfaces 26. As previously mentioned, allowance is made for the material which is displaced by the panel such that the recess of frame 10 is very nearly filled after the panel has been inserted.

Figure 3:
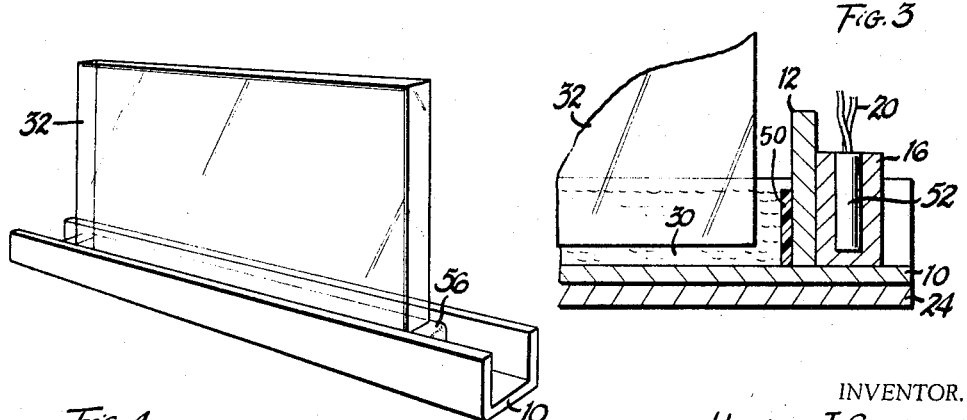
FIGURE 3 is a fragmentary sectional view taken along line 3—3 of FIGURE 2 showing particularly a region of solidified bedding material adjoining one of the damming bodies.

The temporary damming bodies 12 and 14 are then heated by means of the cartridge heaters within the blocks 16 and 18. One such heater 52 is shown in FIGURE 3 inside the block 16. The damming bodies 12 and 14 are heated to a curing temperature for the liquid bedding material. Referring to FIGURE 3, heat from damming body 12 is transferred to the liquid bedding material contacting and immediately adjoining the damming bodies, and this heat causes a layer 50 of the bedding material to cure to a solidified form. Once the solid layer 50 has been formed, it acts as a dam and holds the remaining liquid bedding material 30 in the recess of the frame member 10. Another layer like the layer 50 is formed at the other end of the assembly next to the damming body 14.

Once the solid layers 50 have been formed, the damming bodies 12 and 14 together with the heater blocks 16 and 18 may be removed from the assembly. The damming layers 50 will hold the liquid bedding material in the frame without the aid of the damming bodies 12 and 14. The damming bodies 12 and 14 should be coated with a release agent which will allow these bodies to be removed from the solidified layer 50. For example, the damming bodies may be coated with silicone rubber.

The next step of the method is to heat the remaining liquid bedding material so as to cure it to its solid form wherein it adheres to the glass panel and to the frame. This heating may be accomplished by placing the entire assembly of frame, panel and bedding material together with the fixturing apparatus shown in FIGURE 2 in an oven for a predetermined time, the oven being maintained at a curing temperature for the liquid bedding material. The oven temperature may, for example, be 250° to 300° F. Other types of heating may be used if desired. For example, cartridge heaters could be built into the fixture block 24 so as to heat up the block and in turn heat the frame member 10 and the liquid bedding material contained in the frame. Alternatively, current might be passed through the metal frame member 10 to heat the frame member and the adjoining bedding material. High frequency induction heating might also be employed if desired.

Figure 4:
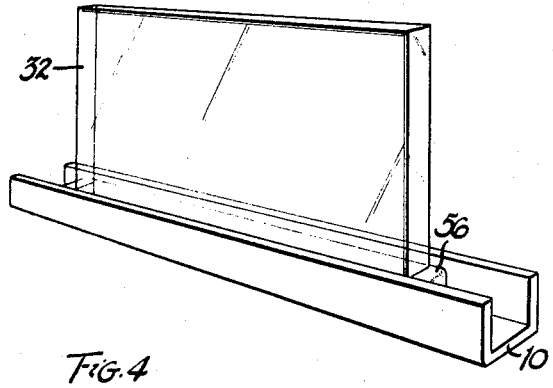
FIGURE 4 is a perspective view of the final assembly of frame, panel and bedding material.

When the assembly is removed from the oven, the frame, panel and bedding material are all bonded together to provide an assembly as shown in FIGURE 4. This assembly is removed from the fixturing apparatus after the heating step. The bedding material 56 is now all solid and firmly anchors the panel 32 to the frame 10.

The sequence of steps which has just been described is the preferred sequence, but alterations could be made. For example, the panel 32 could be inserted into the frame 10 (FIGURE 1) before the frame is filled with liquid bedding material. Then, after the panel has been inserted, the liquid bedding material could be injected into the space remaining between the panel and the frame. This injection would ordinarily have to be done under pressure, and so it would be necessary to seal the space into which material is to be injected. Since it is much easier to fill the frame first and then insert the panel, this is the preferred sequence.

The invention thus provides a method of bedding by the basic steps of partially filling a frame with heat curable liquid bedding material, inserting a panel edge into the bedding material, and heating to cure the liquid bedding material to its solid form. A feature of the method is the damming of the frame with temporary damming bodies and the forming of additional damming bodies by heating the temporary ones to solidify the liquid bedding material immediately adjoining the damming bodies. The temporary damming bodies may then be removed from the assembly before the final heating step. By this method, then, a portion of the liquid bedding material is converted into damming layers which retain the remainder of the liquid bedding material in the frame until the final heat curing step.

I claim:

1. A method of bedding a panel into a frame having interior surfaces defining a recess for receiving a marginal edge of said panel, said method comprising the following steps without implied limitation to the sequence thereof: damming said recess with heat conductive damming bodies at two places spaced from each other along the length of said frame, partially filling said recess with liquid bedding material, said liquid bedding material being curable by heat to a solid form which is adherent to said panel and said frame, placing a marginal edge of said panel in said recess to immerse said panel edge in said liquid bedding material therein, selectively heating said damming bodies to a curing temperature for said liquid bedding material to thereby heat the liquid bedding material contacting and immediately adjoining said damming bodies so that the latter liquid bedding material cures to said solid form and forms additional dams across said recess, said damming bodies are removed from said recess after heating the same; and heating the remaining liquid bedding material to cure the same to said solid form wherein the solidified bedding material forms a bed for said panel in said frame.

2. The method of claim 1 wherein said panel edge is placed in said recess of said frame before said recess is partially filled with liquid bedding material.

3. The method of claim 1 wherein said panel edge is placed in said recess of said frame after said recess is partially filled with liquid bedding material.

4. The method of claim 1 wherein said heating of remaining liquid bedding material is carried out by placing the assembly of frame, panel and bedding material in an oven for a predetermined time, said oven being maintained at a curing temperature for said liquid bedding material.

5. The method of claim 4 wherein said heating of said damming bodies is carried out by placing electrical heating elements in said recess adjoining said damming bodies, and energizing said heating elements to heat the same and to transfer heat therefrom to said damming bodies.

6. The method of claim 5 wherein said electrical heating elements are removed from said recess along with said damming bodies after heating of said bodies and before said remaining liquid bedding material is heated to cure the same.

7. The method of claim 6 wherein said selective heating of said damming bodies is carried out after said panel edge is immersed in said liquid bedding material.

8. A method of bedding a panel into a frame having interior surfaces defining a recess for receiving a marginal edge of said panel, said method comprising the steps of damming said recess with heat conductive damming bodies at two places spaced from each other along the length of said frame, immersing a marginal edge of said panel in liquid bedding material at least partially filling said recess, said liquid bedding material being curable by heat to a solid form which is adherent to said panel and said frame, heating said damming bodies to a curing temperature for said liquid bedding material to thereby heat the liquid bedding material contacting and immediately adjoining said damming bodies so that the latter liquid bedding material cures to said solid form and forms additional dams across said recess, removing said damming bodies from said recess, and heating the remaining liquid bedding material to cure the same to said solid form wherein the solidified bedding material forms a bed for said panel in said frame.

References Cited

UNITED STATES PATENTS

| | | | |
|---|---|---|---|
| 2,136,423 | 11/1938 | Fields | 18—55 |
| 2,328,525 | 8/1943 | Egolf | 18—58 |
| 2,409,958 | 10/1946 | Rogers | 18—58 |
| 3,026,575 | 3/1962 | Lusher | 18—59 |
| 3,192,567 | 7/1965 | Abernathy | 18—36 |
| 3,263,014 | 7/1966 | Deisonroth | 264—261 |

ROBERT F. WHITE, *Primary Examiner.*

RICHARD R. KUCIA, *Assistant Examiner.*

U.S. Cl. X.R.

264—327, 271